(12) United States Patent
Smock

(10) Patent No.: US 12,128,858 B2
(45) Date of Patent: Oct. 29, 2024

(54) CART WITH POWERED FOLDING IN A BATTERY ELECTRIC VEHICLE

(71) Applicant: Honda Motor Co., Ltd., Tokyo (JP)

(72) Inventor: Randall A. Smock, Redondo Beach, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 548 days.

(21) Appl. No.: 17/509,206

(22) Filed: Oct. 25, 2021

(65) Prior Publication Data

US 2023/0126601 A1 Apr. 27, 2023

(51) Int. Cl.
| | | |
|---|---|---|
| *B62B 3/02* | (2006.01) | |
| *B60S 5/06* | (2019.01) | |
| *B62B 3/04* | (2006.01) | |
| *B62B 3/14* | (2006.01) | |
| *B62B 5/00* | (2006.01) | |
| *H02J 7/00* | (2006.01) | |

(52) U.S. Cl.
CPC ................ *B60S 5/06* (2013.01); *B62B 3/025* (2013.01); *B62B 3/04* (2013.01); *B62B 3/1464* (2013.01); *B62B 5/0003* (2013.01); *H02J 7/0045* (2013.01)

(58) Field of Classification Search
CPC ... B60S 5/86; B62B 3/025; B62B 3/04; B62B 3/1464; B62B 3/1468; B62B 3/1472; B62B 3/1776; B62B 5/0003
See application file for complete search history.

(56) References Cited

U.S. PATENT DOCUMENTS

| | | | |
|---|---|---|---|
| 6,024,527 A | 2/2000 | Soriano | |
| 6,076,298 A | 6/2000 | Teel | |
| 6,575,491 B2 * | 6/2003 | Miller | ................... B62B 5/0003 |
| | | | 280/638 |
| 7,427,080 B2 | 9/2008 | Naude, Jr. et al. | |
| 8,191,907 B2 | 6/2012 | Watson | |
| 8,979,115 B1 * | 3/2015 | Baron | ..................... B62B 3/106 |
| | | | 280/DIG. 4 |
| 9,102,343 B2 * | 8/2015 | Lee | ........................ B60B 19/003 |
| 9,211,899 B2 * | 12/2015 | Beauchamp | ............. B62B 3/027 |
| 9,573,610 B1 * | 2/2017 | Chaturvedi | ............. B62B 3/005 |

(Continued)

FOREIGN PATENT DOCUMENTS

| | | |
|---|---|---|
| CN | 110126901 B | 2/2021 |
| DE | 10052587 A1 | 5/2002 |

(Continued)

*Primary Examiner* — John D Walters
(74) *Attorney, Agent, or Firm* — Plumsea Law Group, LLC

(57) ABSTRACT

A cart with powered folding and unfolding capability is provided. The cart has a cradle for holding a load, a frame supporting said cradle, said frame including a U-shaped leg member defining a pair of free ends connected to said cradle and a cross-bar end connected to a pair of wheels for ground engagement to enable said cart to roll along the ground, at least one leg pivot motor coupled to said leg member to enable powered folding of said leg member with respect to said cradle. The cart has a battery disposed on said cradle to power said leg pivot motor to enable powered folding and unfolding of said leg member. The cart also has an actuator disposed on said frame to initiate powered folding or unfolding of said leg member. Such a cart may also include a pair of auxiliary legs which are capable of powered folding.

20 Claims, 11 Drawing Sheets

(56) References Cited

U.S. PATENT DOCUMENTS

| | | | |
|---|---|---|---|
| 10,232,867 B1* | 3/2019 | Jones | B62B 3/1404 |
| 11,046,343 B2 | 6/2021 | Stroh | |
| 11,440,575 B2* | 9/2022 | Baldridge | B62B 3/022 |
| 11,628,103 B2* | 4/2023 | Moore | A61G 5/04 |
| | | | 280/304.1 |
| 11,685,415 B2* | 6/2023 | Hofmann | B62B 5/085 |
| | | | 280/651 |
| 2011/0156375 A1 | 6/2011 | Gal | |
| 2018/0228281 A1* | 8/2018 | Biermann | B65D 81/3813 |
| 2021/0197879 A1 | 7/2021 | Whitley | |
| 2024/0002174 A1* | 1/2024 | Martin | B60R 5/04 |

FOREIGN PATENT DOCUMENTS

| | | |
|---|---|---|
| DE | 102016103593 A1 | 8/2017 |
| DE | 102017127550 A1 | 5/2019 |
| FR | 2836444 A1 | 6/2004 |
| FR | 3013022 A1 | 5/2015 |
| JP | 5296271 B1 | 9/2013 |
| KR | 101526691 B1 | 6/2015 |
| RU | 2646019 C1 | 2/2018 |
| RU | 2647824 C1 | 3/2018 |
| TW | I408071 B | 9/2013 |
| WO | 2005028277 A1 | 3/2005 |
| WO | 2017140287 A1 | 8/2017 |
| WO | 2020222370 A1 | 11/2020 |

\* cited by examiner

CART WITH POWERED FOLDING IN A BATTERY ELECTRIC VEHICLE

BACKGROUND

This disclosure relates generally to a cart with powered folding and unfolding capability adapted to be integrated into a storage area of a vehicle, such as in a frunk of a battery electric vehicle (BEV).

There are number of issues with existing shopping carts that have yet to be addressed. For example, currently, retail stores need to maintain a group of shopping carts for their customers, and it may be inconvenient for customers to borrow shopping carts from these pre-existing groups of store-owned shopping carts for a number of reasons. The store-owned shopping carts may be awkward to maneuver through a store, particularly if the store is small or passageways narrow and tight. Also, when the customer is done shopping, he or she may be required to physically unload the contents of his or her shopping cart into a vehicle and then return the shopping cart to the store or a collection point. Once the vehicle is in motion, the goods may shift around in the cargo storage area of the vehicle causing disorganization or worse damage to the goods or other items stored in the vehicle. Additionally, the user may be required to manually unload the cargo one they reach their destination. It has been observed that a simple grocery shopping trip requires a purchased item to be moved and handled multiple times from the shelf, to a shopping cart, to a vehicle, and then offloaded from the vehicle and into the user's final destination. The inefficiency and potential for damage to the items is something that people have become accustomed to, and seemingly accept as the only way. In addition, all of this handling highlights the potential contamination to the carts, users and items, and potentially transmissibility of infectious agents which has become a heightened concern in the time period in which this description is being written.

Accordingly, there is a need in the art for an improved way to address the inefficiencies, and provide an improved personal cart which can be integrated to a personal vehicle.

SUMMARY

In one aspect, a cart with powered folding and unfolding capability is provided. The cart has a cradle for holding a load. The cart also has a frame supporting said cradle, said frame including a U-shaped leg member defining a pair of free ends connected to said cradle and a cross-bar end connected to a pair of wheels for ground engagement to enable said cart to roll along the ground. The cart also has at least one leg pivot motor coupled to said leg member to enable powered folding of said leg member with respect to said cradle. The cart also has a battery disposed on said cradle to power said leg pivot motor to enable powered folding and unfolding of said leg member with respect to said cradle upon actuation. The cart also has an actuator disposed on said frame to initiate powered folding or unfolding of said leg member.

In another aspect, an automated portable storage cart is provided. The cart has one or more bins situated on a cradle, the bins providing storage space and the cradle being coupled to two legs supporting the cradle and connecting the cradle to a wheel assembly comprising rear wheels and front wheels, the legs being angled, each leg comprising an angled top connection portion and a lower support portion, each leg comprising a leg pivot motor situated at a point of connection between the respective leg and the cradle next to the respective top angled connection portion, and each leg further comprising a wheel pivot motor situated at a point of connection between a leg and respective rear wheel of the wheel assembly next to an end of the respective lower support portion. The cart also has a battery, situated in the cradle and electrically coupled to the leg pivot motors and the wheel pivot motors, configured to store energy to power the leg pivot motors and the wheel pivot motors to automatically load the automated portable storage cart into a storage area of a vehicle, such the wheel pivot motors are powered to fold the wheel assembly into the lower support portions of the legs, the leg pivot motors are powered to fold the legs to cause the lower support portions of the legs and the wheel assembly to parallel a bottom surface of the cradle, and such that the leg pivot motors are further powered to translate the legs and the wheel assembly towards a front of the portable storage cart, the top angled connection portions of the legs being configured to extend from a front portion of the automated portable storage cart to engage with a receptacle at the storage area of the vehicle. The cart is initially placed into proximity with the receptacle at the front portion of the vehicle and once the cart is finished folding, the cart is configured to be automatically received by the receptacle for storage in the storage area of the vehicle.

In another aspect, a system comprising a cart and a docking capsule is provided. The system includes a cart with powered folding and unfolding capability. The cart includes a cradle for holding a load. The cart further includes a frame supporting said cradle, said frame including a U-shaped leg member defining a pair of free ends connected to said cradle and a cross-bar end connected to a pair of wheels for ground engagement to enable said cart to roll along the ground. The cart further includes at least one leg pivot motor coupled to said leg member to enable powered folding of said leg member with respect to said cradle. The cart further includes a battery disposed on said cradle to power said leg pivot motor to enable powered folding and unfolding of said leg member with respect to said cradle upon actuation. The cart further includes an actuator disposed on said frame to initiate powered folding or unfolding of said leg member. The docking capsule is configured to receive the cart. The docking capsule is a part of a vehicle configured to receive said cart when folded and in a docked configuration. Said docking capsule comprises an electrical connector to electrically connect to said battery to charge said battery while docked.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 4A shows a cart in a standing position; FIG. 4B shows how a wheel assembly of a cart folds into legs; FIG. 4C shows how legs fold beneath a cradle of a cart; FIG. 4D shows how folded legs move to a front of a cradle of a cart;

DETAILED DESCRIPTION

Figure 1:
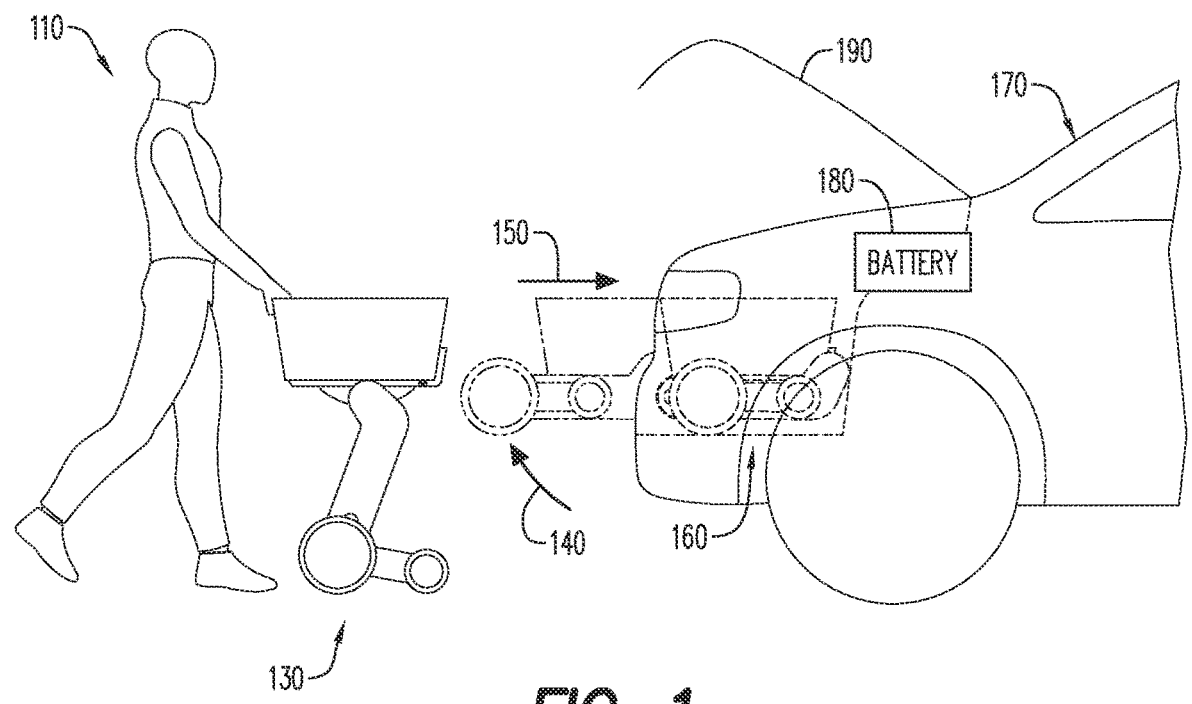
FIG. 1 is a representative view of a user with a personal cart and a vehicle in accordance with aspects of the present disclosure.

Embodiments of a cart with powered folding and unfolding capability are described herein that allow a user to transport a self-loading/unloading cart in a cargo area of a vehicle. For example, much of the disclosure focuses on a cart that is stored in a frunk (i.e., similar to a trunk, but located in the front of a vehicle rather than a rear of the vehicle) of a battery electric vehicle (BEV). This particular type of cart is discussed further below and presents certain efficiencies, conveniences and advantages for personal use.

In the following disclosure, the term "cart" is used to refer to all wheeled vehicles used to carry items on a platform or within a basket mounted to the cart frame, in keeping with the commonly understood definition of "cart," including those that include only mechanical components. The term as used herein may also refer to carts that have electronics to assist in aspects of using the cart, such as folding and unfolding the cart.

However, it will be readily recognized that the present disclosure applies to variants of the cart that offer many of the same advantages. For example, a cart may fold as described herein, but may be stored in a trunk, or the vehicle may be powered by a fuel such as gasoline or diesel fuel, or may use a hybrid motor, as non-limiting examples, rather than being limited to a BEV.

For example, embodiments of the carts described herein may be used for shopping, camping, recreational uses, deliveries, yard work, at events or businesses, for moving furniture, boxes, or other goods, etc. The cart of the example embodiments is also able to automatically fold and automatically load itself into the cargo area of the vehicle when the cart is not being used, so it may be conveniently stored without taking up a large amount of space. Such automatic folding also loads the contents of the cart for storage in the vehicle without the need for the user to manually load and unload the contents of a shopping cart.

Furthermore, when the cart is stored in the vehicle, the cart may be electrically connected to a battery or another electrical power source of the vehicle, which may recharge an internal power storage device of the cart. Such an internal power storage device of the cart may act as an energy source that allows the cart to automatically fold and unfold as the vehicle captures the cart for internal storage in a receptacle, such as a designated area of a frunk. The energy source may also power other features of the cart, such as a powered heating element or a powered lighting element.

The cart described herein may address some of the following shortcomings in the art, discussed in greater detail, below.

Present carts, present certain challenges, as discussed briefly, above. For example, when a customer goes to a store, he or she may select a cart from a bank of carts provided by a store. However, selecting a cart may be inconvenient. For example, it may be awkward to obtain a cart from a bank of provided carts. Additionally, the provided carts are shared between multiple users. As a result, all available carts may be in use. Moreover, the other users may leave trash or other infectious material in carts, so using shared carts may not be hygienic.

Another issue with present carts is that the shopping carts may have a large footprint. While this may provide the carts with additional storage volume, it causes the carts to be awkward to maneuver especially in tight or crowded spaces. If a customer maneuvers such a large cart through a store, it requires that the store provides a significant amount of aisle space and/or makes it difficult for the customer to maneuver.

Another issue with present carts is that it may be awkward and/or difficult to move the contents of carts into a storage space of a vehicle, such as a trunk (which is typically a storage area located in a rear portion of a vehicle) or a frunk (which is a storage area similar to a trunk, but situated in a front portion of a vehicle). However, vehicles may also include storage areas in different portions of the vehicle, such as storage on top of the vehicle, below the vehicle, or in a side compartment of the vehicle. When unloading a cart, the user may need to laboriously lift items from the cart, such as groceries or other goods, into a trunk or frunk of the vehicle, and this effort may be unpleasant or may even cause back injuries. Unloading in this manner may also take extra time.

Another issue with existing carts is that such carts must be returned to the store or a collection point. In order to do so, once the carts are unloaded, the customer must return the cart to the bank of carts which it was originally obtained, or must take the cart back to an area from which store employees can take the cart back to the bank of carts. Moreover, sometimes customers simply leave carts in a parking lot, which can be inconvenient or pose the possibility of damaging other vehicles in the parking lot. It also places a burden on the stores to provide staffing to retrieve the carts when the customers abandon the carts in the middle of the lot. Even if the customers leave carts at a designated pickup area, the carts must be returned by store employees.

Moreover, under ordinary circumstances, once the customer has unloaded goods such as groceries into a trunk or a frunk, the goods may shift around because an ordinary vehicle does not include structures in a trunk or frunk to anchor the goods and prevent the goods from shifting during transport. When the customer reaches his or her destination, the customer must then manually unload the goods such as groceries from the trunk or frunk. Such unloading may be inconvenient in a similar manner to the inconvenience and other drawbacks that occur when loading the goods into a trunk or frunk.

The embodiments are described herein with reference to an electrically powered self-folding cart. In an embodiment, the self-folding cart folds automatically and stores itself in an appropriately adapted storage portion of a vehicle. However, the principles of the example embodiments described herein may be applied to other types of cargo transporters having different forms. Such a self-folding cart, as discussed further below, may be able to help with the issues posed above with respect to other carts. For example, carts that are non-necessarily self-folding may incorporate other features of the self-folding cart.

For example, the self-folding cart may be dedicated to a single user whose frunk in which it is stored. Thus, there is no need to select a cart or worry about sanitary issues, in that the user has his or her own dedicated cart. Additionally, there may be structures in the frunk that disinfect the cart while it is stored. Such structures minimize health risks when using the cart.

Additionally, the self-folding cart may be sized to be relatively narrow, with a relatively small footprint. Further, the self-folding cart may automatically unload the cart from the frunk in an easy, assisted manner. Also, the user does not need to worry about returning a cart. The cart is able to automatically re-integrate its basket into the frunk (or trunk). Because the basket of the cart holds the goods, the goods are less likely to shift during transport. Finally, unloading the cart is not necessary until the cart reaches its final destination, and because the cart supports the basket, the cart may facilitate transporting goods in the basket until they go where they are intended to go.

The preferred cart described herein may be referred to as a FrunKART in that the present disclosure describes aspects of a cart that is a Battery Electric Vehicle (BEV) frunk-integrated grocery cart. Such a FrunKART has the attributes that it is able to load and unload itself from a frunk of a vehicle (i.e., a storage space similar to a trunk of a vehicle, but located in the front of the vehicle). It is understood that the cart disclosed herein is more generally a self-folding cart and may be stored in any storage location in a vehicle or building.

The vehicle may be a BEV, which makes it more appropriate to locate the cart in the frunk, as this will facilitate connecting the FrunKART to a battery of the vehicle, to power the FrunKART for functionality such as the folding/unfolding, loading/unloading, heating/cooling, and other features such as lighting. Usually, a battery of a BEV is located in the front of the BEV, so it is helpful to store the FrunKART in the front of the BEV, more proximate to the battery of the BEV. Also, there is more space in a BEV for a frunk because the BEV does not require the engine and other elements that would otherwise take up the space in a fuel-powered vehicle that could be allocated to a frunk.

However, while certain embodiments are described in the context of a FrunKART, other embodiments may incorporate related features and the disclosure is not to be interpreted as limiting.

For example, a FrunKART may be a cart with powered folding and unfolding capability including a cradle for holding a load, a frame supporting said cradle, said frame including a U-shaped leg member defining a pair of free ends connected to said cradle and a cross-bar end connected to a pair of wheels for ground engagement to enable said cart to roll along the ground. The FrunKART may also include at least one leg pivot motor coupled to said leg member to enable powered folding of said leg member with respect to said cradle. The FrunKART may also include a battery disposed on said cradle to power said leg pivot motor to enable powered folding and unfolding of said leg member with respect to said cradle upon actuation. Finally, the FrunKART may include an actuator disposed on said frame to initiate powered folding or unfolding of said leg member.

Furthermore, the FrunKART may further include a pair of auxiliary legs connected to said U-shaped leg member proximate to said cross-bar end and including a pair of auxiliary wheels thereon, said auxiliary legs also including auxiliary leg pivot motors to enable powered folding of said auxiliary legs with respect to said frame.

In an embodiment, said U-shaped leg member has an elbow shape with a shorter portion proximate to said cradle and a longer portion extending from said shorter portion to said cross-bar end.

FIG. 1 is a representative view of a user with a Frunk-Integrated Grocery Cart (referred to hereinafter as a FrunK-ART, as noted above) and a vehicle in accordance with aspects of the present disclosure. Here, a FrunKART refers to a self-folding cart stored in the frunk of a vehicle. The representative view of FIG. 1 shows a user 110 integrating the FrunKART 130 in its original position into the frunk of vehicle 170. As the FrunKART 130 transitions into vehicle 170, in the frunk, the FrunKART 130 automatically folds itself into a folded form 140 as it is placed into an intake system of vehicle 170 that feeds the FrunKART 130 into storage compartment 160 in the frunk of vehicle 170.

Once FrunKART 130 is integrated into storage compartment 160, the storage compartment 160 may secure the basket, may charge the internal battery of the FrunKART 130, and may heat or cool appropriate elements that keep a compartment of the basket at a cool or warm temperature. For example, it may be difficult to keep food cold, so the vehicle 170 may power a cooling unit, such that a cold-pack integrated into the FrunKART 130 is maintained as frozen until the FrunKART 130 is unloaded from vehicle 170. Alternatively, by ensuring that an internal battery of the FrunKART 130 is charged, the FrunKART 130 stores energy for folding/unfolding, temperature control, and lighting, as non-limiting examples.

In FIG. 1, the vehicle 170 includes a battery 180. Battery 180 charges the FrunKART 130. The FrunKART 130 also includes a rechargeable battery which is charged by battery 180. In the example of a FrunKART 130, battery 180 is the main source of energy for vehicle 170. However, other embodiments use fuel to provide energy in conjunction with an engine, and battery 180 stores energy for an ignition process and to operate electrical systems in the vehicle 170. Either way, the battery 180 provides electrical energy to the FrunKART 130, which the FrunKART 130 uses to recharge an internal battery for powering its cart functionality, as discussed further, above.

Figure 2:
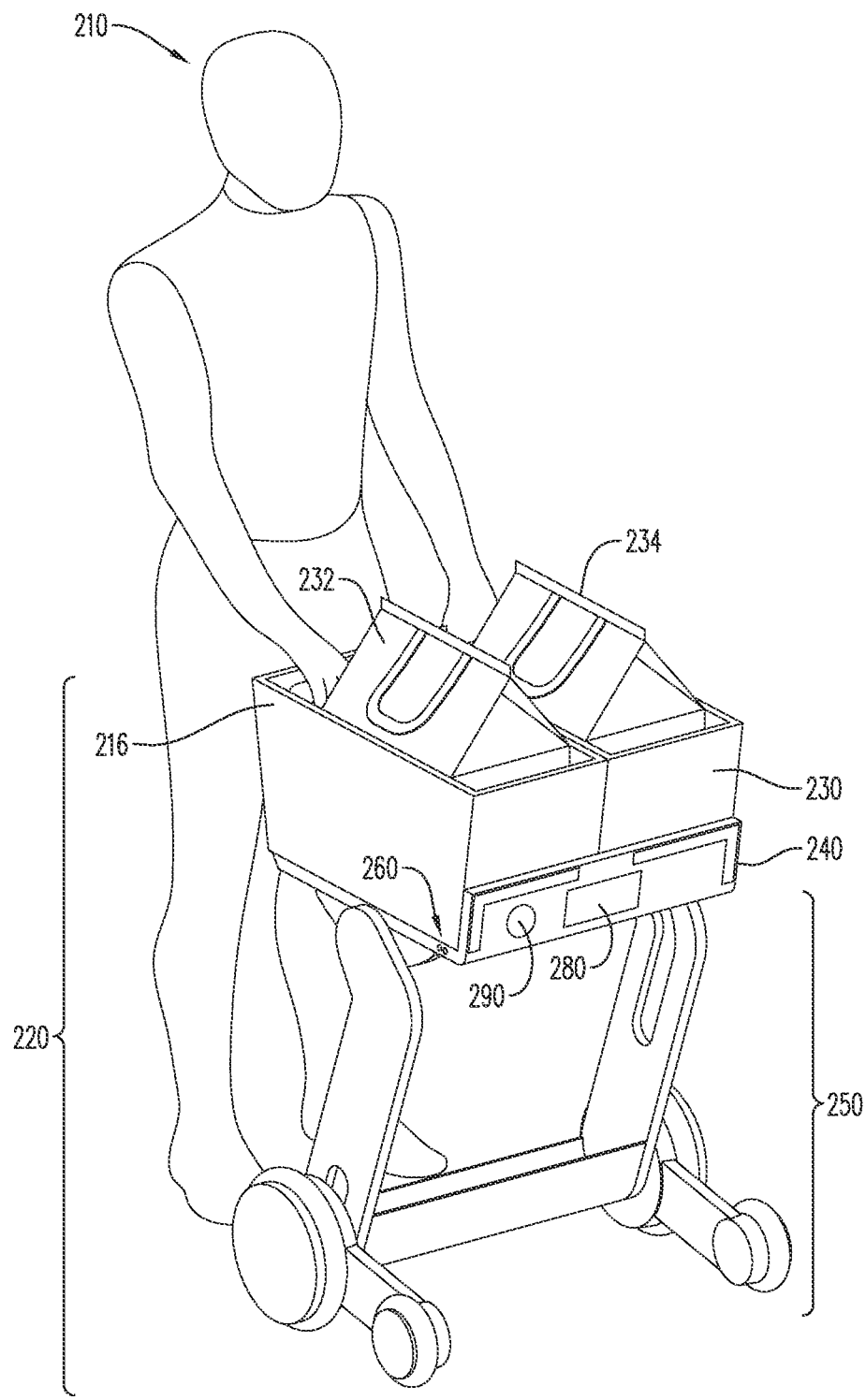
FIG. 2 is a representative view of a user standing with a personal cart from a side view in accordance with aspects of the present disclosure.

FIG. 2 is a representative view of a user standing with a FrunKART from a side view in accordance with aspects of the present disclosure. For example, a user 210 stands with his or her hands rested on a handlebar 216 of bin 230. Bin 230 has areas for bags 232 and 234. For example, bags 232 and 234 may be ECO-bags. Such bags are ECO-bags in that the bags 232 and 234 may be reused and/or may be made of recyclable or ecologically friendly materials. However, other bags made of various materials such as paper, plastic, or fabric may also be used.

The bin 230 rests in a cradle 240 of the FrunKART 220. The cradle 240 is affixed to a frame 250. Additional aspects of the frame 250 are illustrated and described in further detail, below. The cradle 240 may also include mode indicator lights 260. For example, the mode indicator lights 260 may indicate whether the FrunKART 220 is in a folded mode or in a standing mode. The mode indicator lights 260 may include additional lights representing the stages of transformations between a fully folded mode and a fully standing mode. There may be intervening modes, some of which are stable and some of which are not. The mode indicator lights may also indicate whether additional elements, such as a heating element, are active, and may also provide information about a charge state of an internal battery of the FrunKART 220.

The FrunKART 220 may also include a battery 280 that powers functions of the FrunKART, where the battery is controlled by an actuator 290. As discussed above, battery 280 is preferably a rechargeable battery that is recharged when the FrunKART is in storage, but it is also possible that battery 280 is a replaceable or single-use battery 280. Actuator 290 is a control, such as a switch, a dial, or a button as non-limiting examples, that signals to the FrunKART that it should fold or unfold, as described further below. The actuator 290 may also be triggered by other appropriate events that indicate that a folding or unfolding sequence should begin.

For example, the actuator 290 may come into contact with part of a vehicle when the user pushes the FrunKART into the frunk of a vehicle, initiating the loading process. Similarly, when the FrunKART is stored in a vehicle, a dashboard control of the vehicle or another control in the frunk may trigger the actuator 290 to let it know that it is time to unload the FrunKART. The locations of battery 280 and actuator 290 shown in FIG. 2 are only examples and other locations are possible.

For example, FIG. 2 shows the battery 280 as being present in a front portion of the cradle 240. However, the battery 280 may also be located in a bottom portion of the cradle 240. The battery 280 may be electrically connected to the bin 230, whether the battery 280 is located in the front portion of the cradle 240 or the bottom portion of the cradle 240. Accordingly, the battery 280, by its electrical connection to the bin 230, is able to supply electrical energy to the bin 230 as a whole or to sub-portions of the bin 230. If the battery 280 is located in the bottom portion of the cradle 240, it may facilitate providing separate electrical energy to sub-portions of the bin 230.

As another example, FIG. 2 shows the actuator 290 as being present in a front portion of the cradle 240, such that the actuator 290 would activate when it comes into contact with a frunk or other storage area into which the FrunKART is to be loaded. However, an alternative placement of the actuator 290 would be to place the actuator 290 in the handlebar 216, so the user 210 would have ready access to the actuator 290 to initiate a loading/unloading sequence.

Figure 3:
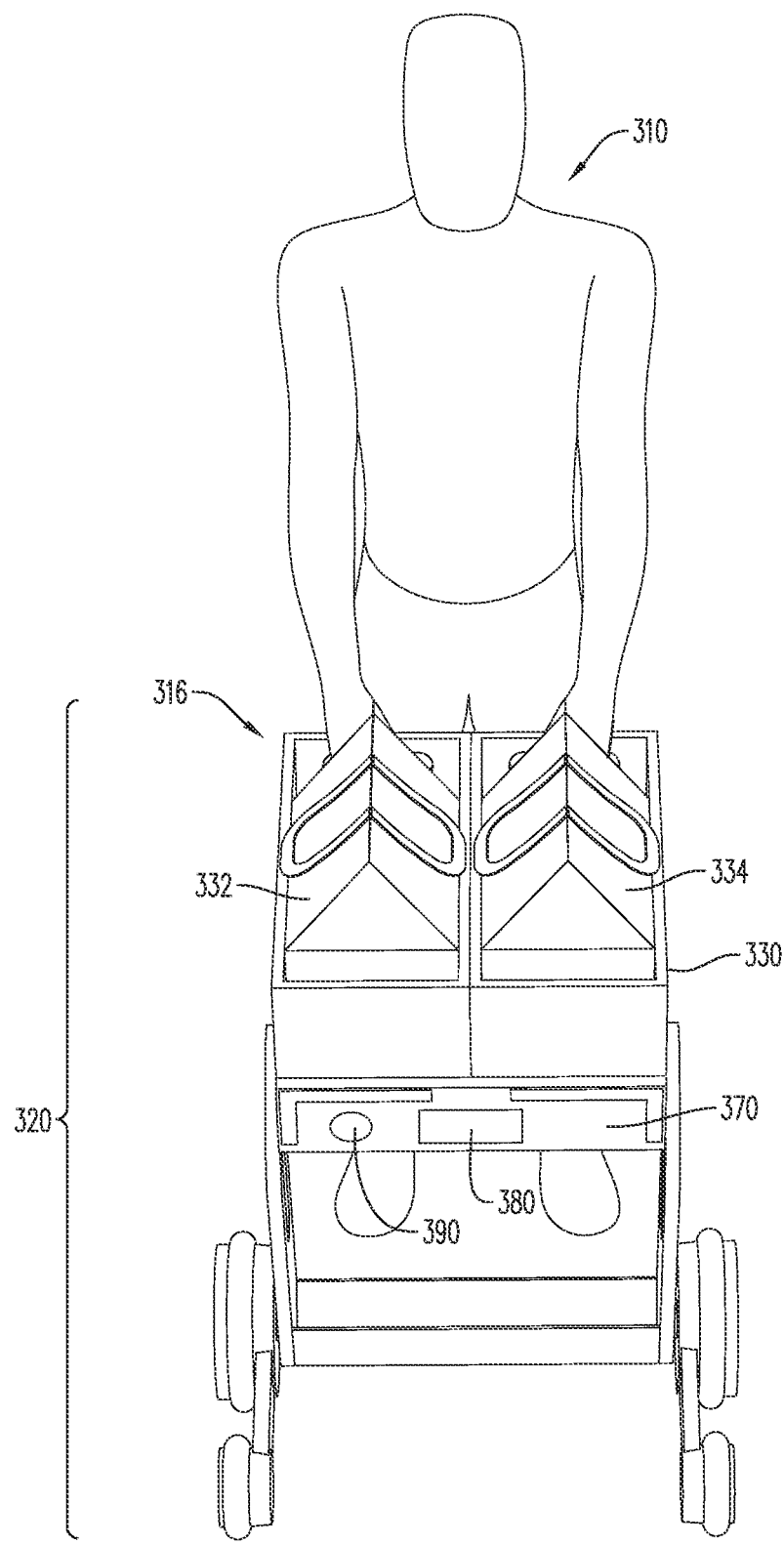
FIG. 3 is a representative view of a user standing with a personal cart from a front view in accordance with aspects of the present disclosure.

FIG. 3 is a representative view of a user standing with a FrunKART from a front view in accordance with aspects of the present disclosure. Most of the elements of FIG. 3, such as user 310, handlebar 316, FrunKART 320, bin 330, bags 332 and 334, frame 350, battery 380, and actuator 390 correspond to like elements of FIG. 2. FIG. 3 also shows safety lights 370. These safety lights 370 may be powered by the battery 380 of the FrunKART 320, or may have a separate battery. For example, the safety lights 370 may be charged by solar power or by capturing energy supplied by the user pushing the cart during the day and may light up for safety at night. The safety lights 370 may also include reflective surfaces, such as mirrors, reflective tape, or bright patches of cloth.

Figure 4A:
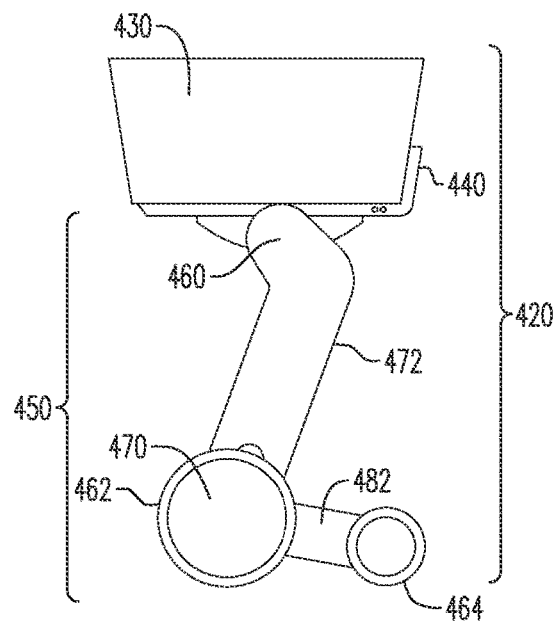
FIGS. 4A-4D are representative views of a folding process of a personal cart in accordance with aspects of the present disclosure.
Figure 4B:
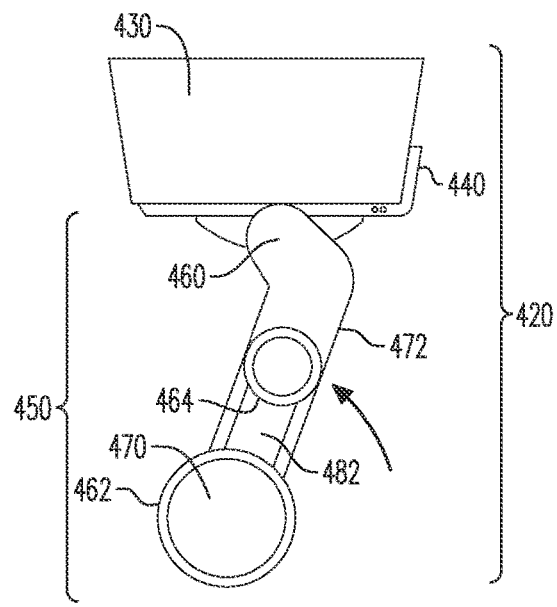
Figure 4C:
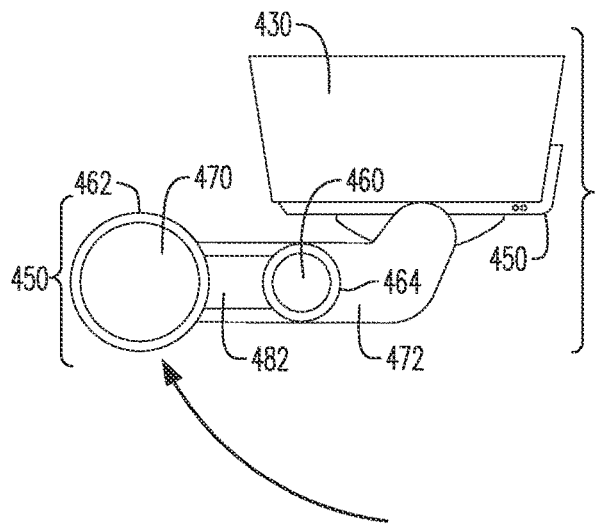
Figure 4D:
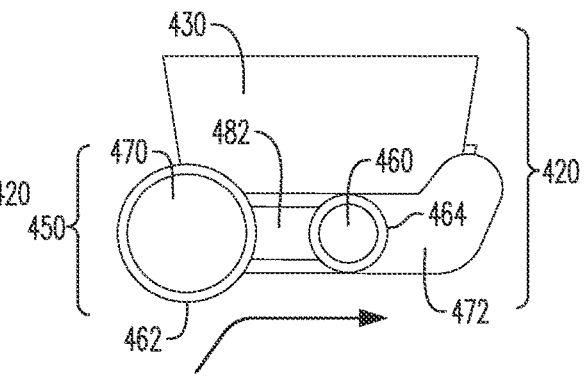

FIGS. 4A-4D are representative views of a folding process of a FrunKART in accordance with aspects of the present disclosure. FIG. 4A shows a FrunKART in a standing position. FIG. 4B shows how a wheel assembly of a FrunKART folds into legs. FIG. 4C shows how legs fold beneath a cradle of a FrunKART. FIG. 4D shows how folded legs move to a front of a cradle of a FrunKART.

FIGS. 4A-4D show a side view of the FrunKART. Hence, only one instance of certain elements such as rear wheels 462, front wheels 464, and legs 472 are presented and shown in these drawings. However, it will be recognized that counterpart elements are also present on the other side of the FrunKART.

For example, FIG. 4A shows a FrunKART in a standing position. In the standing position, FrunKART 420 includes a bin 430 that rests on frame 450. The frame 450 supports the bin 430. As shown in FIGS. 2-3, by way of example, the bin 430 may include at least one bag, such as an ECO bag, as noted above. The top portion of frame 450, upon which bin 430 rests, is the cradle 440.

At the point of attachment between the cradle 440 and a lower portion of frame 450, there is situated a leg pivot motor 460 at a top portion of legs 472. The leg pivot motor 460 is a motor that is able to rotate the legs 472 to fold the legs 472 in one direction so that the legs 472 fold under the cradle 440, or rotate the legs 472 in the other direction so that the legs 472 unfold from under the cradle 440.

FIG. 4A also shows a base 482 supporting the legs 472, which in turn support the cradle 440, which in turn supports bin 430. The base 482 includes rear wheels 462 and front wheels 464.

As shown in FIG. 4A, rear wheels 462 may be larger than front wheels 464 for greater stability, but this is only a non-limiting example, and in other embodiments, the rear wheels 462 and the front wheels 464 may be the same size, or the front wheels 464 may be larger than the rear wheels 462. However, in general it is preferred that the rear wheels 462 be larger than front wheels 464 as this will facilitate storage of the FrunKART. The rear wheels 462 have integrated into them a wheel pivot motor 470. The wheel pivot motor 470 is able to rotate the base 482. Thus, the wheel pivot motor 470 folds the base 482 into legs 472, such that front wheels 464 fold up into legs 472.

FIG. 4B shows how a wheel assembly of a FrunKART folds into legs. As noted above, FIG. 4A shows the FrunKART in a standing position. FIG. 4B includes the same elements as FIG. 4A. However, in FIG. 4B, the folding process has begun. Specifically, wheel pivot motor 462 engages and swings base 482 so that base 482 is integrated into and/or aligned with legs 472. Thus, FIG. 4B shows a stage at which the FrunKART has begun folding itself. FIG. 4B is not meant as a permanent stage, in that once the base 482 has been folded into legs 472, the FrunKART is no longer stable and the folding process should continue with FIG. 4C.

FIG. 4C shows how legs fold beneath a cradle of a FrunKART. As shown in FIG. 4B, prior to FIG. 4C, the base 482 has been folded into legs 472. In FIG. 4C, the folding process continues. Specifically, leg pivot motor 460 swings the assembly including the base 482 and the legs 472 so that the base 482 and the legs 472 are parallel to the bottom of the bin 430 and the cradle 440. Once the operations of FIG. 4C are complete, the FrunKART 420 is in a position where the bin 430 is positioned on top of the folded base 482 and the folded legs 472, but the bin 430 extends forward from these elements.

FIG. 4D shows how folded leg moves to a front of a cradle of a FrunKART. The moving forward of the legs helps integrate the FrunKART 420 into a frunk in which it is stored. For example, the legs 472 and base 482 are drawn forward. As is discussed further in greater detail below, the legs 472 and base 482 are drawn forward for storage in a compartment of a vehicle. In particular, aspects of how such storage occurs are discussed further below with respect to FIG. 11.

Figure 5A:
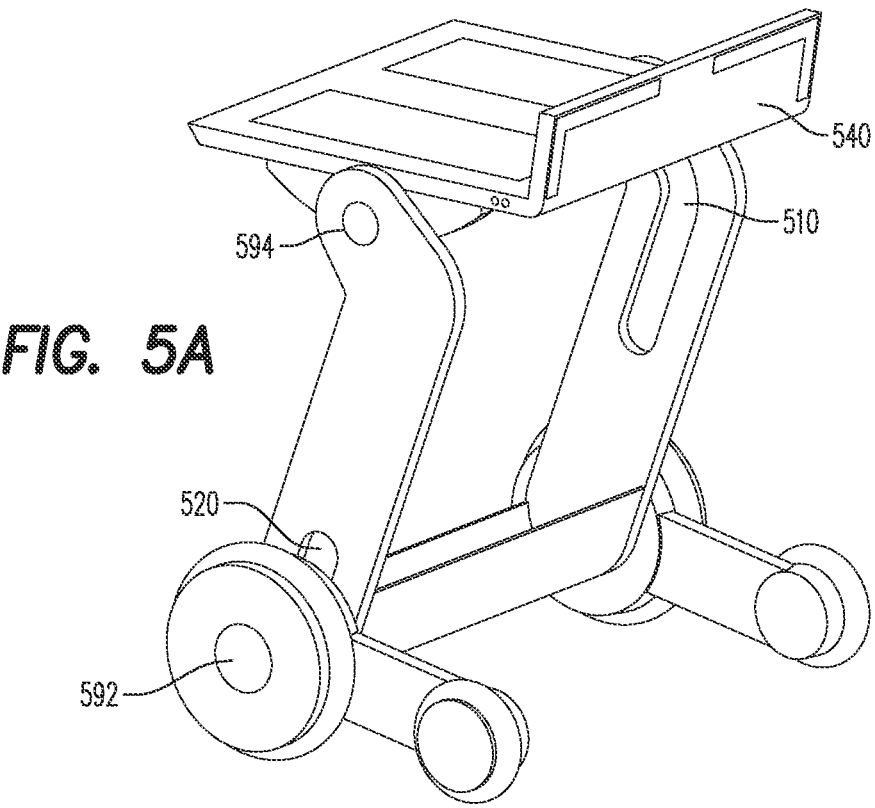
FIGS. 5A-5B are representative side views of grooves in legs, facilitating a folding process in accordance with aspects of the present disclosure.
Figure 5B:
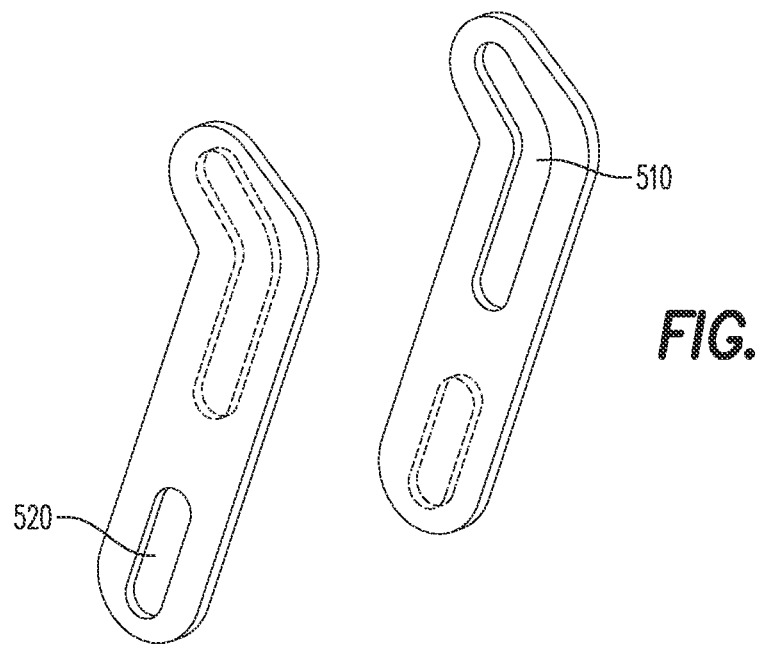

FIGS. 5A-5B are representative side views of grooves in legs, facilitating a folding process in accordance with aspects of the present disclosure.

FIGS. 5A-5B show an example where the U-shaped leg member of the FrunKART has a slot with corresponding shorter portion and longer portion to receive respective pivot pins associated with said cradle and movement of the pivot pins with said slot results in folding and unfolding motion. The pivot pins are illustrated in FIG. 5A as lower pivot pin 592 and upper pivot pin 594.

Specifically, FIGS. 5A-5B show upper groove 510 and lower groove 520. When transitioning from the positions of FIG. 4B to FIG. 4C, lower pivot pin 592 slides along lower groove 520, as legs 472 are folded to be parallel with cradle 440. Then, when transitioning from the positions of FIG. 4C to FIG. 4D, upper pivot pin 594 slides along upper groove 510, as legs 472 are shifted forward. FIG. 5A also shows how a cradle 540 is supported by the bars with upper groove 510 and lower groove 520.

Figure 6:
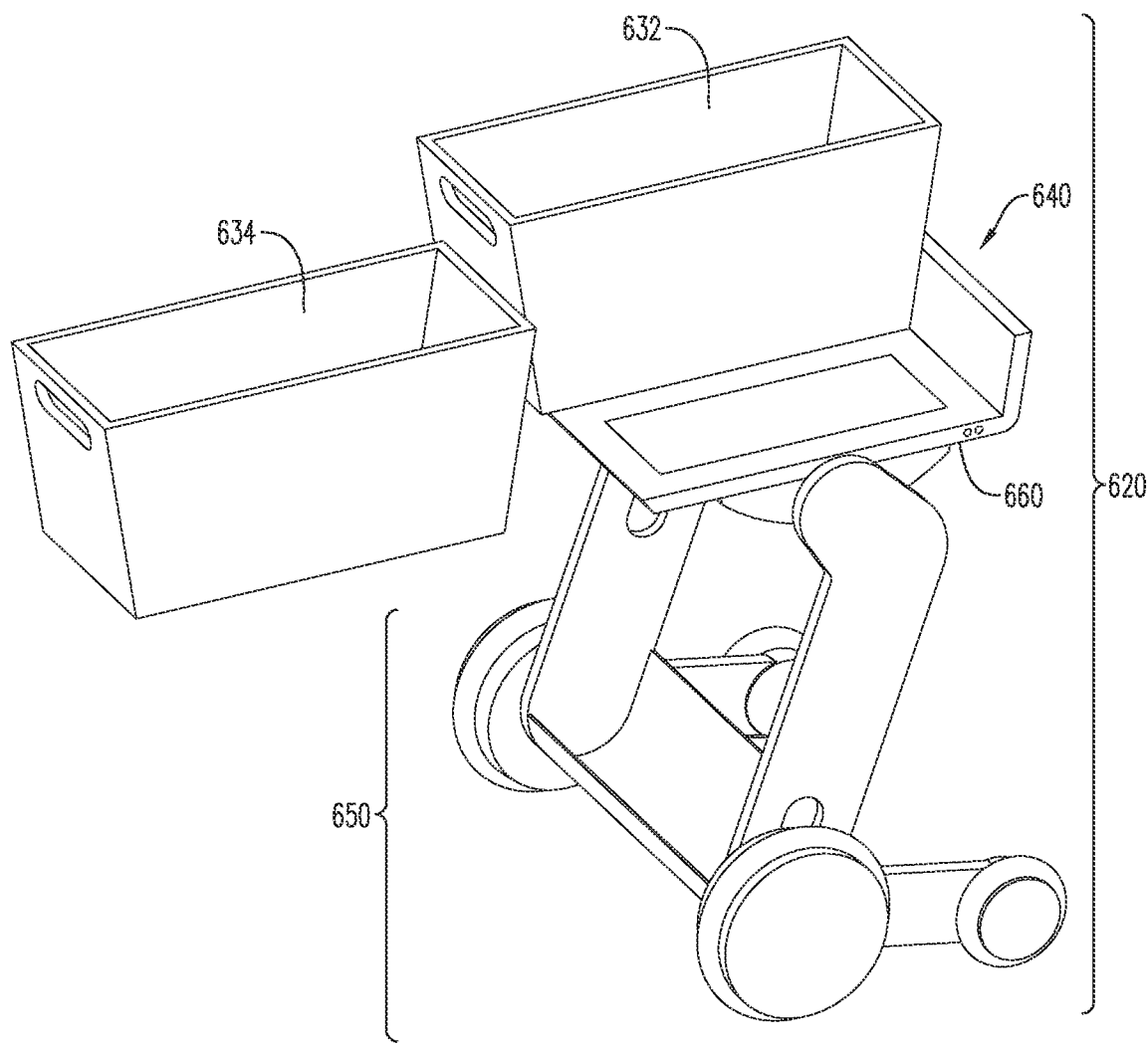
FIG. 6 is a representative view of removable bins and associated heating and cooling elements in accordance with aspects of the present disclosure.

FIG. 6 is a representative view of removable bins and associated heating and cooling elements in accordance with aspects of the present disclosure.

While FIG. 6 shows a use case where there is a FrunKART 620 with two bins 632 and 634, each holding items in half of the area on top of the cradle, this is only a non-limiting example, and in other examples, there may be one unified bin. FIG. 6 also shows that the bins 632 and 634 are removable. However, in other examples, the bins 632 and 634 are not removable.

FIG. 6 is also a representative view showing heating and cooling elements in accordance with aspects of the present disclosure, discussed further, below. Also, FIG. 6 shows an example in which the bins are located on a left side and a right side of the cradle. However, other arrangements of bins are possible, in other examples. For example, there may be forward and rear bins, and so on.

FIG. 6 also illustrates that the cradle may include warming and chilling elements. These warming and chilling elements may be active or passive elements. For example, the warming elements may be powered heating coils, or the chilling elements may be previously frozen cold-packs. Such powered heating coils are illustrated as being powered heating coils 660 in FIG. 6. However, these are only non-limiting examples of warming elements and chilling elements. In a given FrunKART, the FrunKART may include only warming elements, only chilling elements, or a combination of warming and chilling elements.

The warming and chilling elements may be present to keep food at an appropriate temperature for consumption. For example, a user may wish to maintain soup or coffee at a warm or hot temperature as hot soup or hot coffee may be more palatable. Additionally, keeping food at a warm or hot temperature may cook the food. Also, keeping for at a cool or cold temperature may keep food from spoiling. For example, if the food is maintained at a refrigerated temperature, the food may last longer before spoiling. If the food is maintained at or below a temperature below the freezing point of water (i.e., 0° C.), the food may be maintained in a frozen state and may remain unspoiled for an extended period of time.

It is to be noted that it may be useful to use the warming and chilling elements together in combination. For example, a user may consume some of the warm food and transfer the leftovers to the chilling elements to avoid spoilage. Alternatively, a user may take cool food and transfer it to the warming element for defrosting, warming, and/or cooking. However, these are only examples, and other examples are possible in other embodiments. For example, the user may use the warming element to brew a hot beverage, such as coffee or tea, and then use the chilling element to provide iced coffee or iced tea. The user may also use cold packs or ice in the chilling element to cool food.

There may also be interface buttons to control elements such as powered heating coils 660. For example, these interface buttons may control how hot/cold the warm/cold compartments should be.

Figure 7A:
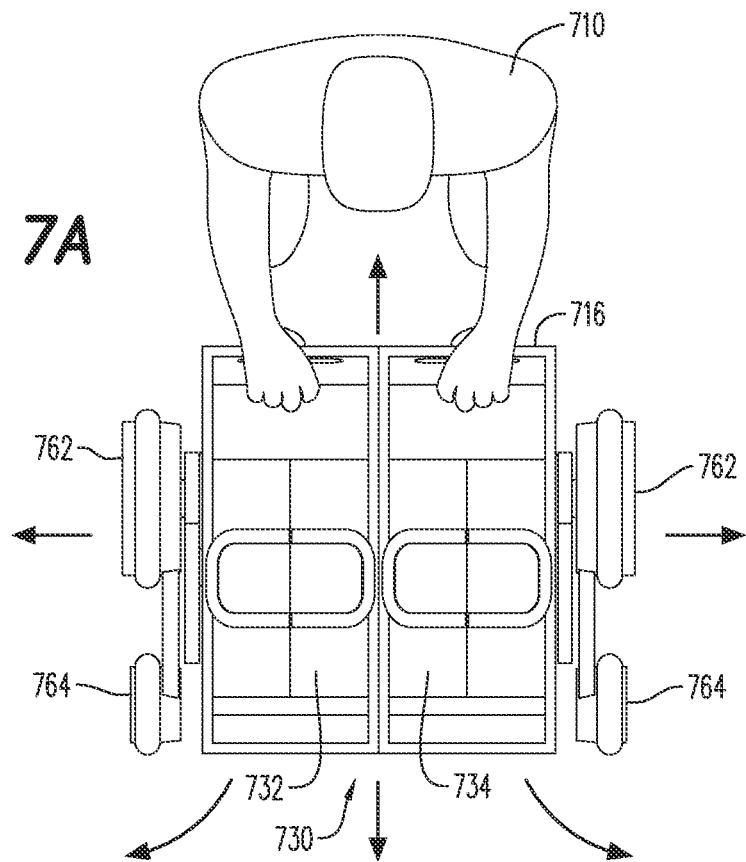
FIG. 7A illustrates a representative overhead view of the cart in accordance with aspects of the present disclosure.

FIG. 7A illustrates a representative overhead view of the FrunKART in accordance with aspects of the present disclosure. For example, FIG. 7A shows user 710, handlebar 716, bin 730, bags 732 and 734, rear wheels 762, and front wheels 764. The FrunKART may be placed in various motion modes. For example, the FrunKART may be placed in a first mode of front turn only, in which front wheels 764 are able to move back and forth as well as turn, while rear wheels 762 only move back and forth. In another mode, the FrunKART may provide for a 4-wheel turn. In such a mode, the front wheels 764 and the rear wheels 762 may each turn as well as move back and forth.

As yet another mode, the user may lock the wheels of the FrunKART. In this mode, the wheels cannot turn or move until the wheels are unlocked. Such a lock may use an appropriate locking mechanism that blocks the wheels from moving and/or turning, such as a pad or a pin, as non-limiting examples, that restrain the wheels' movement.

Figure 7B:
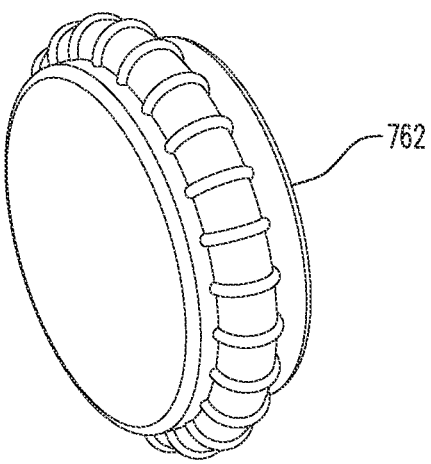
FIG. 7B is an enlarged view of a wheel of the cart in accordance with aspects of the present disclosure.

FIG. 7B is an enlarged view of a wheel of the FrunKART in accordance with aspects of the present disclosure. In an example, rear wheel 462, as well as the other rear wheel 462 and both front wheels 464 are manually pushed omni-directional Mecanum wheels. A Mecanum wheel is an omnidirectional wheel design for a wheeled vehicle to easily move in any direction. Such a Mecanum wheel uses a tireless wheel with rubberized external rollers obliquely attached to the whole circumference of its rim. The rollers are angled in a particular way, such that each wheel has its own powertrain, and may be vectored into a longitudinal and a transverse component in relation to the vehicle.

The design of a Mecanum wheel allows the vehicle to move straight ahead, move sideways, move diagonally, move around a bend, rotate, and/or move around a central point of one axle. Thus, using a Mecanum wheel assembly facilitates a cart that can move and rotate in various ways easily. Moreover, because a Mecanum wheel involves wheels that do not themselves move, it may be easier to dock a FrunKART with Mecanum wheels into the frunk of a vehicle.

However, it is to be recognized that FIG. 7B is only an example, and other types of wheel designs may be used. Further, in some examples, rear wheels 462 or front wheels 464 are locked in place and can only go backwards and forwards, such that the other wheels are able to rotate to turn the FrunKART.

Figure 8:
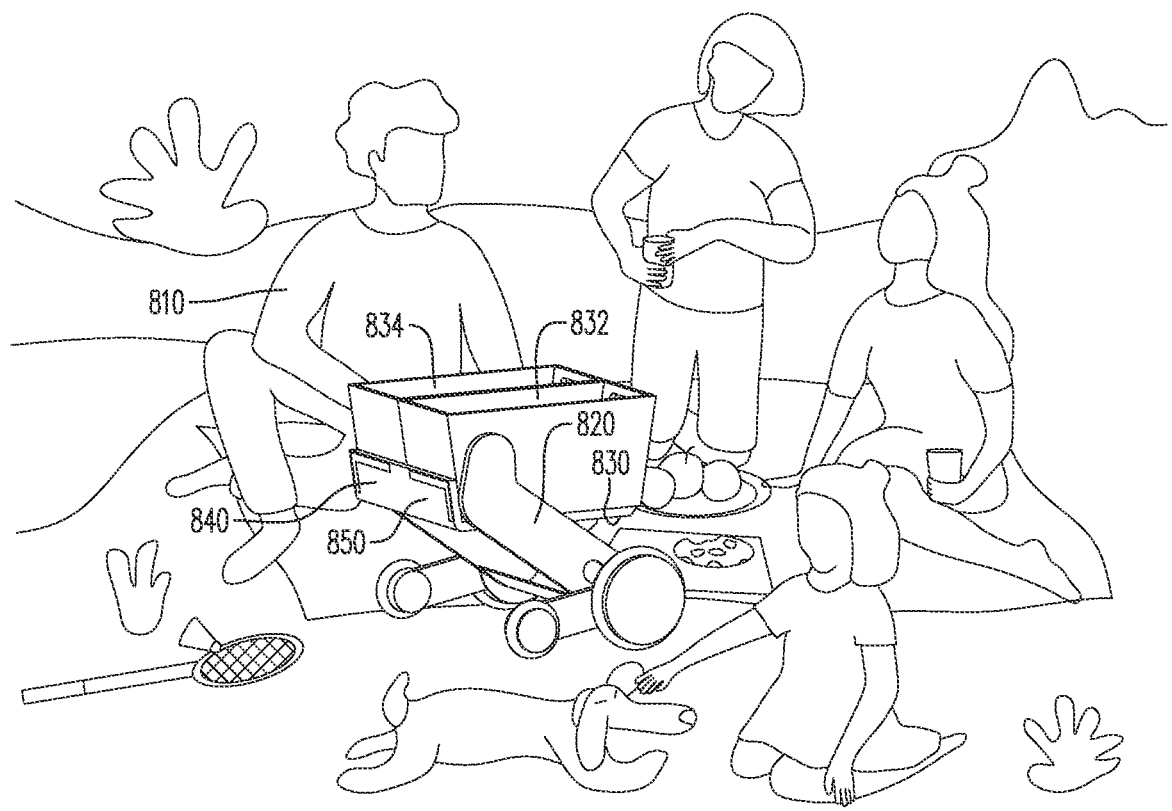
FIG. 8 is a representative view of a picnic use case of the cart in accordance with aspects of the present disclosure.

FIG. 8 is a representative view of a picnic use case of the FrunKART in accordance with aspects of the present disclosure. For example, one or more users 810 may be seated having a picnic in a park. However, this is only one example, and the users 810 may be seated at a table, and may also possibly be in an indoor environment rather than an outdoor environment.

FIG. 8 shows the FrunKART 820 in a partially folded state. By being partially folded, the FrunKART 820 is at a good height for access by the users 810 to items stored in the FrunKART 820. The FrunKART 820, in accordance with the above discussion, includes bins 830, such as bins 832 and 834, which reside in cradle 840, supported by base 850. The FrunKART 820 may have an adjustable height. For example, the legs of the FrunKART 820 may be partially folded, so that the FrunKART 820 is neither fully standing nor fully folded. Thus, for example, if the top of FrunKART 820 is usually three or four feet above the ground, it may be one or two feet above the ground in a picnic use case. It may also be possible to place a lid on FrunKART 820 to provide a flat surface for use when eating. FIG. 8 also shows the frame 850 of the FrunKART 820, which has been adjusted to be partially folded.

Figure 9:
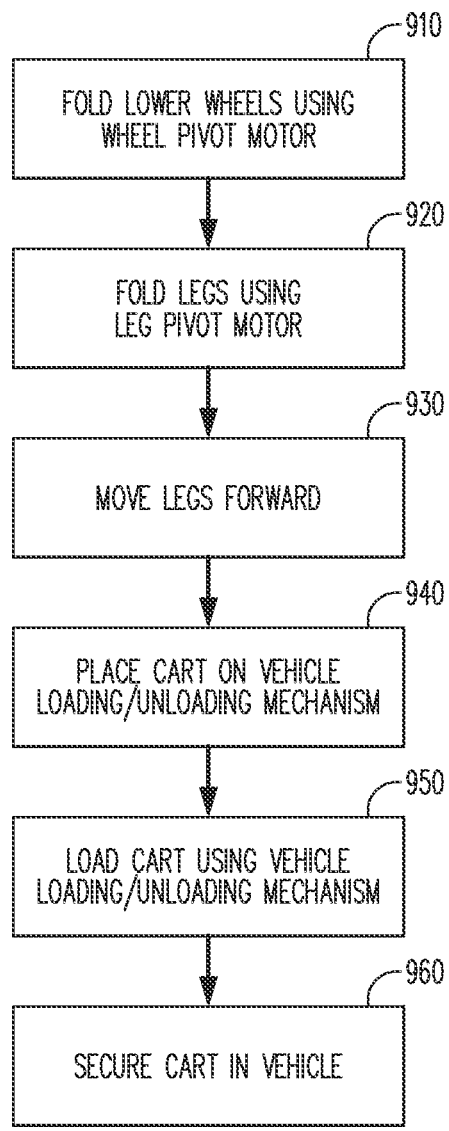
FIG. 9 is a flowchart of steps involved in loading a cart in accordance with aspects of the present disclosure.

FIG. 9 is a flowchart of steps involved in loading a FrunKART in accordance with aspects of the present disclosure.

Figure 11:
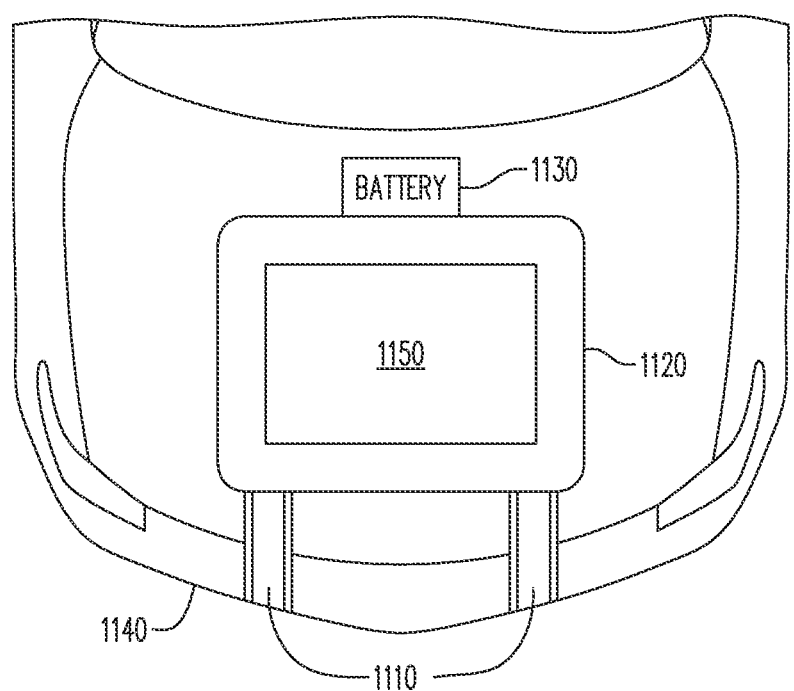
FIG. 11 is a representative view of an example reception area in a vehicle for a cart in accordance with aspects of the present disclosure.

Prior to the steps in FIG. 9, a user initiates a loading process for his or her FrunKART. For example, the user may use a control device of the FrunKART to indicate to the FrunKART that it is time to start folding. Alternatively, once the FrunKART is sufficiently close to a vehicle (i.e. within a threshold proximity), the FrunKART may automatically sense that the folding/loading process should begin. For example, if a portion of the FrunKART, for example, the front of legs 472 or rear wheels 462 or front wheels 464, comes into contact with a portion of the reception area of the vehicle, as illustrated in FIG. 11, the loading process begins.

In operation 910, the method folds the lower wheels of the FrunKART using the wheel pivot motor. Operation 910 is similar to going from FIG. 4A to FIG. 4B. After this operation, the legs are folded together, but have not been folded into the cradle.

In operation 920, the method folds the legs of the FrunKART using the leg pivot motor. Operation 920 is similar to going from FIG. 4B to FIG. 4C. After this operation, the legs are folded together and have been folded into the cradle.

In operation 930, the method moves the legs of the FrunKART forwards. Operation 920 is similar to going from FIG. 4C to FIG. 4D. After this operation, the legs are folded together, have been folded into the cradle, and have been shifted forward for FrunKART storage.

In operation 940, the method places the FrunKART on a vehicle loading/unloading mechanism. This operation prepares the FrunKART for intake into a storage mechanism. Additional aspects of such storage are discussed along with FIG. 11, below.

In operation 950, the method loads the FrunKART using the vehicle loading/unloading mechanism. This operation actually loads the FrunKART into a storage compartment using an appropriate mechanism. Additional aspects of such storage are discussed along with FIG. 11, below.

In operation 960, the method secures the FrunKART in the vehicle. After this operation, the FrunKART is secure and its contents should be stable. Optionally, it is further possible to cover the bins or shopping bags of the FrunKART, to further restrict the contents of the bins from moving and/or shifting, which could otherwise damage the cargo. Additional aspects of such securing are discussed along with FIG. 11, below.

Figure 10:
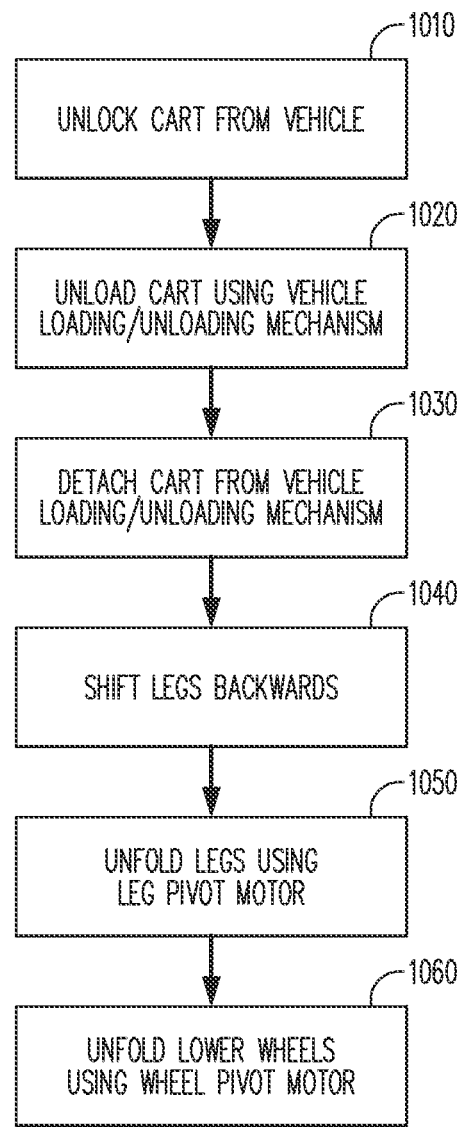
FIG. 10 is a flowchart of steps involved in unloading a cart in accordance with aspects of the present disclosure.

FIG. 10 is a flowchart of steps involved in unloading a FrunKART in accordance with aspects of the present disclosure. These steps are generally the opposite of the steps involved in the loading, as shown in FIG. 9.

In operation 1010, the method unlocks the FrunKART from the vehicle. The operation is essentially the reverse of operation 960, and is conducted accordingly.

For example, the steps taken to secure the vehicle are undone, so the FrunKART may move again. The unlocking is also discussed further with respect to FIG. 11.

In operation 1020, the method unloads the FrunKART using a vehicle loading/unloading mechanism. The operation is essentially the reverse of operation 950, and is conducted accordingly. The unloading is also discussed further with respect to FIG. 11.

In operation 1030, the method detaches the FrunKART from the vehicle loading/unloading mechanism. The operation is essentially the reverse of operation 940, and is conducted accordingly. The unloading is also discussed further with respect to FIG. 11.

In operation 1040, the method shifts the legs backwards. The operation is essentially the reverse of operation 930, and is conducted accordingly. Operation 1040 extends the legs so they are ready to unfold.

In operation 1050, the method unfolds the legs of the FrunKART using a leg pivot motor. The operation is essentially the reverse of operation 920, and is conducted accordingly. Operation 1050 provides the initial unfolding of the legs.

In operation 1060, the method unfolds the lower wheels of the FrunKART using a wheel pivot motor. The operation is essentially the reverse of operation 910, and is conducted accordingly. Operation 1060 unfolds the lower wheels, increasing the stability of the unfolded cart.

FIG. 11 is a representative view of an example reception area in a vehicle for a FrunKART in accordance with aspects of the present disclosure. For example, FIG. 11 shows an area under a hood of vehicle 1140. The vehicle may provide a compartment 1120 for the FrunKART 1150. For example, the vehicle 1140 may include a receiving mechanism 1110. The user may engage the wheels or front area of the FrunKART 1150 with the receiving mechanism 1110.

Once the FrunKART 1150 is situated in compartment 1120, it may be in electrical contact with battery 1130, which may charge the FrunKART 1150 during storage in the vehicle. The compartment 1120 may also include heating/cooling elements to keep food in the FrunKART 1150 warm or cold, or to prepare hot-packs or cold-packs to keep the food in the FrunKART 1150 warm or cold.

FIG. 11 shows storage aspects of the frunk. Additional details are provided about the loading and unloading process. Part of the loading and unloading process occurs by the folding and unfolding that the FrunKART 1150 does by itself. However, as discussed above once the FrunKART 1150 is folded, it is ready for intake into compartment 1120. Compartment 1120 may also be referred to as a docking capsule.

Thus, the folded FrunKART 1150 should be in contact with receiving mechanism 1110. Receiving mechanism 1110 is illustrated as having two parts, such as gears or conveyor belts, that engage with portions of the FrunKART 1150.

However, receiving mechanism 1110 may also include a unified mechanism, more than two mechanisms, or may use other mechanical approaches other than gears or conveyor belts to pull the FrunKART 1150 into the compartment 1120.

Once the FrunKART 1150 is in compartment 1120, it may be locked into place or otherwise anchored. Additionally, the FrunKART 1150 may be covered. These steps help protect the contents of the FrunKART 1150 while the vehicle 1140 travels.

FIG. 11 shows loading and unloading with respect to a frunk. As noted, however, related embodiments may also store the FrunKART 1150 in a trunk or another portion of vehicle 1140.

The loading/unloading process may be designed to keep the top of the FrunKART 1150 level or almost level (level enough to avoid spilling to damage to the contents of the FrunKART 1150) as it is loaded and unloaded from compartment 1120. This avoids spills or damages to the contents of the FrunKART 1150, making it more practical to load and unload the FrunKART 1150 without needing to actually take the contents out of the FrunKART 1150 until they reach their final destination and are ready for use.

Thus, the FrunKART as provided offers many advantageous features that solve problems presented by current shopping carts that have not yet been solved by existing cart technology.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A cart with powered folding and unfolding capability comprising:
   a cradle for holding a load;
   a frame supporting said cradle, said frame including:
      a U-shaped leg member defining a pair of free ends connected to said cradle and a cross-bar end connected to a pair of primary wheels for ground engagement to enable said cart to roll along the ground;
   at least one leg pivot motor coupled to said U-shaped leg member to enable powered folding of said U-shaped leg member rotatably about said cradle to: (a) a first position in which the U-shaped leg member is beneath the cradle with the pair of primary wheels engaging the ground and (b) a second position in which the U-shaped leg member is substantially parallel with the cradle;
   a battery disposed on said cradle to power said leg pivot motor to enable powered folding and unfolding of said U-shaped leg member with respect to said cradle upon actuation; and
   an actuator disposed on said frame to initiate powered folding or unfolding of said U-shaped leg member.

2. The cart of claim 1, further comprising a pair of auxiliary legs each including a free end attached to a pair of auxiliary wheels, the pair of auxiliary legs rotatably connected to the primary wheels proximate to said cross-bar end such that the pair of auxiliary legs fold to a position in which the pair of auxiliary legs are substantially parallel with the U-shaped leg member when the U-shaped leg member is in the second position.

3. The cart of claim 2, wherein the wheels of the pair of wheels and the wheels of the auxiliary wheels are Mecanum wheels and wherein said auxiliary legs also include auxiliary leg pivot motors connected to the primary wheels proximate to said cross-bar end to enable powered folding of said auxiliary legs with respect to said frame.

4. The cart of claim 2, further comprising a docking capsule configured to receive said cart when folded and in a docked configuration, said docking capsule comprising an electrical connector to electrically connect to said battery to providing charging to said battery while docked.

5. The cart of claim 4, wherein, when said cart is placed into contact with said docking capsule, the cart initiates the powered folding.

6. The cart of claim 4, wherein, when docking, the U-shaped leg member and the pair of auxiliary leg members are shifted forward to integrate with the docking capsule.

7. The cart of claim 1, wherein said U-shaped leg member has an elbow shape with a shorter portion proximate to said cradle and a longer portion extending from said shorter portion to said cross-bar end.

8. The cart of claim 7, wherein said U-shaped leg member has a slot with corresponding shorter portion and longer portion to receive respective pivot pins associated with said cradle and movement of the pivot pins with said slot results in folding and unfolding motion.

9. The cart of claim 1, wherein said cradle holds at least one bin, wherein each bin is removable from said cradle, wherein said bins include shopping bags, and the shopping bags are removable from said bins.

10. The cart of claim 1, wherein said cradle further comprises at least one temperature control element.

11. An automated portable storage cart, comprising:
   one or more bins situated on a cradle, the bins providing storage space and the cradle being coupled to two legs supporting the cradle and connecting the cradle to a wheel assembly comprising rear wheels and front wheels, the legs being angled, each leg comprising an angled top connection portion and a lower support portion, each leg comprising a leg pivot motor situated at a point of connection between the respective leg and the cradle next to the respective top angled connection portion, and each leg further comprising a wheel pivot motor situated at a point of connection between a leg and respective rear wheel of the wheel assembly next to an end of the respective lower support portion; and
   a battery, situated in the cradle and electrically coupled to the leg pivot motors and the wheel pivot motors, configured to store energy to power the leg pivot motors and the wheel pivot motors to automatically load the automated portable storage cart into a storage area of a vehicle, such the wheel pivot motors are powered to fold the wheel assembly into the lower support portions of the legs, the leg pivot motors are powered to fold the legs to cause the lower support portions of the legs and the wheel assembly to parallel a bottom surface of the cradle, and such that the leg pivot motors are further powered to translate the legs and the wheel assembly towards a front of the portable storage cart, the top angled connection portions of the legs being configured to extend from a front portion of the automated portable storage cart to engage with a receptacle at the storage area of the vehicle,
   wherein the cart is initially placed into proximity with the receptacle at the front portion of the vehicle and once the cart is finished folding, the cart is configured to be automatically received by the receptacle for storage in the storage area of the vehicle.

12. The cart of claim 11, wherein the cart uses a location sensor to detect proximity to the receptacle and initiates an automatic storage process when the cart is within a sufficient threshold proximity to the receptacle.

13. The cart of claim 11, wherein the battery is charged by a power source from the vehicle when it is stored in the receptacle.

14. The cart of claim 11, wherein the cart is automatically received for storage in the vehicle by an intake mechanism.

15. A system comprising a cart and a docking capsule comprising:
 a cart with powered folding and unfolding capability, the cart comprising:
  a cradle for holding a load;
  a frame supporting said cradle, said frame including a U-shaped leg member defining a pair of free ends connected to said cradle and a cross-bar end connected to a pair of primary wheels for ground engagement to enable said cart to roll along the ground;
  a pair of auxiliary legs each including a free end attached to a pair of auxiliary wheels, the pair of auxiliary legs rotatably connected to the primary wheels proximate to said cross-bar end such that the pair of auxiliary legs fold to a position in which the pair of auxiliary legs are fully contained within the U-shaped leg member;
  at least one leg pivot motor coupled to said U-shaped leg member to enable powered folding of said U-shaped leg member with respect to said cradle;
  a battery disposed on said cradle to power said leg pivot motor to enable powered folding and unfolding of said U-shaped leg member with respect to said cradle upon actuation; and
  an actuator disposed on said frame to initiate powered folding or unfolding of said U-shaped leg member; and
 a docking capsule configured to receive the cart, wherein the docking capsule is a part of a vehicle configured to receive said cart when folded and in a docked configuration, said docking capsule comprising an electrical connector to electrically connect to charge said battery while docked.

16. The system of claim 15, wherein said auxiliary legs also include auxiliary leg pivot motors connected to the primary wheels proximate to said cross-bar end to enable powered folding of said auxiliary legs with respect to said frame.

17. The system of claim 15, wherein the vehicle comprises a mechanism that automatically loads and unloads the cart from the vehicle, wherein the cart is loaded by drawing the U-shaped leg member and pair of auxiliary legs toward a compartment in the vehicle.

18. The system of claim 15, wherein the cart activates the powered folding capability when loading the cart for storage in the vehicle and activates the powered unloading capability when ejecting the cart from storage in the vehicle.

19. The system of claim 15, wherein the U-shaped leg member folds with respect to the cradle to (a) a first position in which the U-shaped leg member is beneath the cradle with the pair of primary wheels engaging the ground and (b) a second position in which the U-shaped leg member is substantially parallel with the cradle, and wherein the U-shaped leg member slides from the second position to a third position beneath the cradle while remaining substantially parallel with the cradle.

20. The system of claim 19, wherein the pair of primary wheels have an outer diameter that is substantially larger than the outer diameter of the pair of auxiliary wheels.

* * * * *